(12) United States Patent
Bauco et al.

(10) Patent No.: US 11,378,736 B2
(45) Date of Patent: Jul. 5, 2022

(54) METALLIZED MIRROR COATINGS FOR LIGHT DIFFUSING OPTICAL FIBERS AND METHODS OF MANUFACTURING THE SAME

(71) Applicant: CORNING INCORPORATED, Corning, NY (US)

(72) Inventors: Anthony Sebastian Bauco, Horseheads, NY (US); Carl Edgar Crossland, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/754,880

(22) PCT Filed: Oct. 9, 2018

(86) PCT No.: PCT/US2018/054987
§ 371 (c)(1),
(2) Date: Apr. 9, 2020

(87) PCT Pub. No.: WO2019/074911
PCT Pub. Date: Apr. 18, 2019

(65) Prior Publication Data
US 2020/0310025 A1    Oct. 1, 2020

Related U.S. Application Data

(60) Provisional application No. 62/569,806, filed on Oct. 9, 2017.

(51) Int. Cl.
*G02B 6/02*       (2006.01)
*C03C 25/47*      (2018.01)
(Continued)

(52) U.S. Cl.
CPC ........ *G02B 6/02052* (2013.01); *C03C 25/105* (2013.01); *C03C 25/16* (2013.01);
(Continued)

(58) Field of Classification Search
CPC .... G02B 6/02052; G02B 6/001; C03C 25/47; C03C 25/105; C03C 25/16; C03C 25/46
See application file for complete search history.

(56) References Cited

U.S. PATENT DOCUMENTS 4,466,697 A * 8/1984 Daniel .................. A47G 19/16
                                                 385/123
4,592,932 A * 6/1986 Biswas ................. C03C 25/104
                                                 427/163.2

(Continued)

FOREIGN PATENT DOCUMENTS

JP       60238471 A    11/1985
JP       61091603 A     5/1986
(Continued)

OTHER PUBLICATIONS

Wu et al; "Intrinsic Fiber-Optic Fabry-Perot Interferometer Bases on Arc Discharge and Single-Mode Fiber"; Applied Optics, V 52, N 12, p. 2670-5, (2013.
(Continued)

*Primary Examiner* — Peter Radkowski
(74) *Attorney, Agent, or Firm* — Svetlana Z. Short; Payal Patel

(57) ABSTRACT

A method of forming a metallized mirror coating on a light diffusing optical fiber (110) includes contacting an end face (118) of a second end (114) of a light diffusing optical fiber (110) with a metallized mirror precursor. The light diffusing optical fiber (110) includes a first end (112) opposite the second end (114), a core (120), a polymer cladding (122) surrounding the core (120) and coplanar with the core at the (Continued)

end face (118) of the second end (114), an outer surface (128), and a plurality of scattering structures (125) positioned within the core (120), the polymer cladding (122), or both, that are configured to scatter guided light toward the outer surface (128) of the light diffusing optical fiber (110). The method also includes heating the metallized mirror precursor such that the metallized mirror precursor bonds to the core (120) and the polymer cladding (122) at the end face (118) of the second end (114) thereby forming a metallized mirror coating on the end face (118) of the second end (114).

20 Claims, 8 Drawing Sheets

(51) Int. Cl.
| | | |
|---|---|---|
| | *C03C 25/105* | (2018.01) |
| | *C03C 25/16* | (2006.01) |
| | *C03C 25/46* | (2006.01) |
| | *F21V 8/00* | (2006.01) |

(52) U.S. Cl.
CPC .............. *C03C 25/46* (2013.01); *C03C 25/47* (2018.01); *G02B 6/001* (2013.01)

(56) References Cited

U.S. PATENT DOCUMENTS

| | | | | |
|---|---|---|---|---|
| 5,513,295 A * | 4/1996 | Go | G02B 6/3616 | 385/136 |
| 5,579,429 A * | 11/1996 | Naum | G02B 1/046 | 385/143 |
| 5,631,994 A * | 5/1997 | Appeldorn | G02B 6/001 | 385/147 |
| 5,958,604 A * | 9/1999 | Riabkov | C25D 5/08 | 428/612 |
| 6,368,467 B1 * | 4/2002 | Andrews | | |
| 6,507,693 B2 * | 1/2003 | Maron | G01L 9/0039 | 385/137 |
| 6,564,087 B1 * | 5/2003 | Pitris | A61B 1/00172 | 600/478 |
| 7,062,140 B2 * | 6/2006 | Bjarklev | G02B 6/02347 | 385/125 |
| 7,242,836 B2 * | 7/2007 | Fushimi | G02B 6/264 | 356/73.1 |
| 7,248,761 B2 * | 7/2007 | Schilling | G02B 6/0096 | 385/25 |
| 7,450,806 B2 * | 11/2008 | Bookbinder | C03B 37/01446 | 385/125 |
| 7,991,257 B1 * | 8/2011 | Coleman | G02B 6/0065 | 385/129 |
| 8,249,408 B2 * | 8/2012 | Coleman | B29D 11/0073 | 385/129 |
| 8,440,857 B2 * | 5/2013 | Virnig | C07C 309/14 | 562/41 |
| 8,591,087 B2 * | 11/2013 | Bickham | G02B 6/02361 | 362/558 |
| 8,619,363 B1 * | 12/2013 | Coleman | G02B 19/0014 | 359/576 |
| 8,620,125 B2 * | 12/2013 | Button | G02B 6/02295 | 385/125 |
| 8,805,141 B2 * | 8/2014 | Fewkes | G02B 6/001 | 385/100 |
| 8,873,912 B2 * | 10/2014 | Dangel | G02B 6/138 | 385/52 |
| 10,481,336 B2 * | 11/2019 | Menard | G02B 6/357 | |
| 2002/0009279 A1 * | 1/2002 | Maron | G01L 11/025 | 385/137 |
| 2002/0034370 A1 * | 3/2002 | Yook | G02B 6/262 | 385/139 |
| 2003/0128944 A1 * | 7/2003 | Skutnik | C03C 25/1061 | 385/123 |
| 2003/0169985 A1 * | 9/2003 | Caron | C03C 14/004 | 385/123 |
| 2005/0111804 A1 * | 5/2005 | Bjarklev | G02B 6/0238 | 385/125 |
| 2005/0135116 A1 * | 6/2005 | Epstein | G02B 6/0061 | 362/615 |
| 2006/0045447 A1 * | 3/2006 | Fushimi | G02B 6/264 | 385/123 |
| 2006/0193555 A1 * | 8/2006 | Schilling | G02B 6/0096 | 385/25 |
| 2009/0210038 A1 * | 8/2009 | Neuberger | G02B 6/262 | 607/89 |
| 2011/0122646 A1 * | 5/2011 | Bickham | G02B 6/02347 | 362/554 |
| 2011/0286222 A1 * | 11/2011 | Coleman | G02B 6/0036 | 362/326 |
| 2012/0039576 A1 * | 2/2012 | Dangel | G02B 6/138 | 385/123 |
| 2012/0125777 A1 * | 5/2012 | Virnig | C07C 309/14 | 205/94 |
| 2018/0299622 A1 * | 10/2018 | Menard | B81B 5/00 | |
| 2020/0049892 A1 * | 2/2020 | Menard | B81B 5/00 | |

FOREIGN PATENT DOCUMENTS

| | | | | |
|---|---|---|---|---|
| WO | | 2009040725 A2 | 4/2009 | |
| WO | WO-2009040725 A2 * | | 4/2009 | ........... G02B 6/0018 |

OTHER PUBLICATIONS

International Search Report and Written Opinion of the International Searching Authority; PCT/US2018/054987; dated Jan. 30, 2019; 15 Pages; European Patent Office.

\* cited by examiner

METALLIZED MIRROR COATINGS FOR LIGHT DIFFUSING OPTICAL FIBERS AND METHODS OF MANUFACTURING THE SAME

CROSS-REFERENCE TO RELATED APPLICATIONS

This application is a national stage application under 35 U.S.C. § 371 of International Application No. PCT/US2018/054987, filed on Oct. 9, 2018, which claims the benefit of priority under 35 U.S.C. § 119 of U.S. Provisional Application Ser. No. 62/569,806 filed on Oct. 9, 2017, the content of which is relied upon and incorporated herein by reference in its entirety.

BACKGROUND

The present disclosure relates to light diffusing optical fiber. More specifically, the present disclosure relates to light diffusing optical fibers that include a metallized mirror coating at an end of the light diffusing optical fiber for reflecting guided light propagating along the light diffusing optical fiber.

BRIEF SUMMARY

According to one embodiment, a method of forming a metallized mirror coating on a light diffusing optical fiber includes contacting an end face of a second end of a light diffusing optical fiber with a metallized mirror precursor. The light diffusing optical fiber includes a first end opposite the second end, a core, a polymer cladding surrounding the core and coplanar with the core at the end face of the second end, an outer surface, and a plurality of scattering structures positioned within the core, the polymer cladding, or both the core and the polymer cladding. The plurality of scattering structures are configured to scatter guided light toward the outer surface of the light diffusing optical fiber such that a portion of the guided light diffuses through the outer surface along the light diffusing optical fiber. The method also includes heating the metallized mirror precursor such that the metallized mirror precursor bonds to the core and the polymer cladding at the end face of the second end of the light diffusing optical fiber thereby forming a metallized mirror coating on the end face of the second end of the light diffusing optical fiber.

In another embodiment, a light diffusing optical fiber includes a first end, a second end opposite the first end, a core, a polymer cladding surrounding the core, an outer surface, and a plurality of scattering structures positioned within the core, the polymer cladding, or both the core and the polymer cladding. The first end includes an end face. The second end includes an end face opposite the end face of the first end. The polymer cladding is coplanar with the core at the end face of the second end. The plurality of scattering structures are configured to scatter guided light toward the outer surface of the light diffusing optical fiber such that a portion of the guided light diffuses through the outer surface along a diffusion length of the light diffusing optical fiber. Further, a metallized mirror coating is directly bonded to the core and the polymer cladding at the end face of the second end and includes a reflective metal material having a reflection percentage of about 70% or greater and a melting point that is greater than an equilibrium operating temperature of the light diffusing optical fiber.

Although the concepts of the present disclosure are described herein with primary reference to light diffusing optical fibers having metallized mirror coatings, it is contemplated that the concepts will enjoy applicability to any optical fiber.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
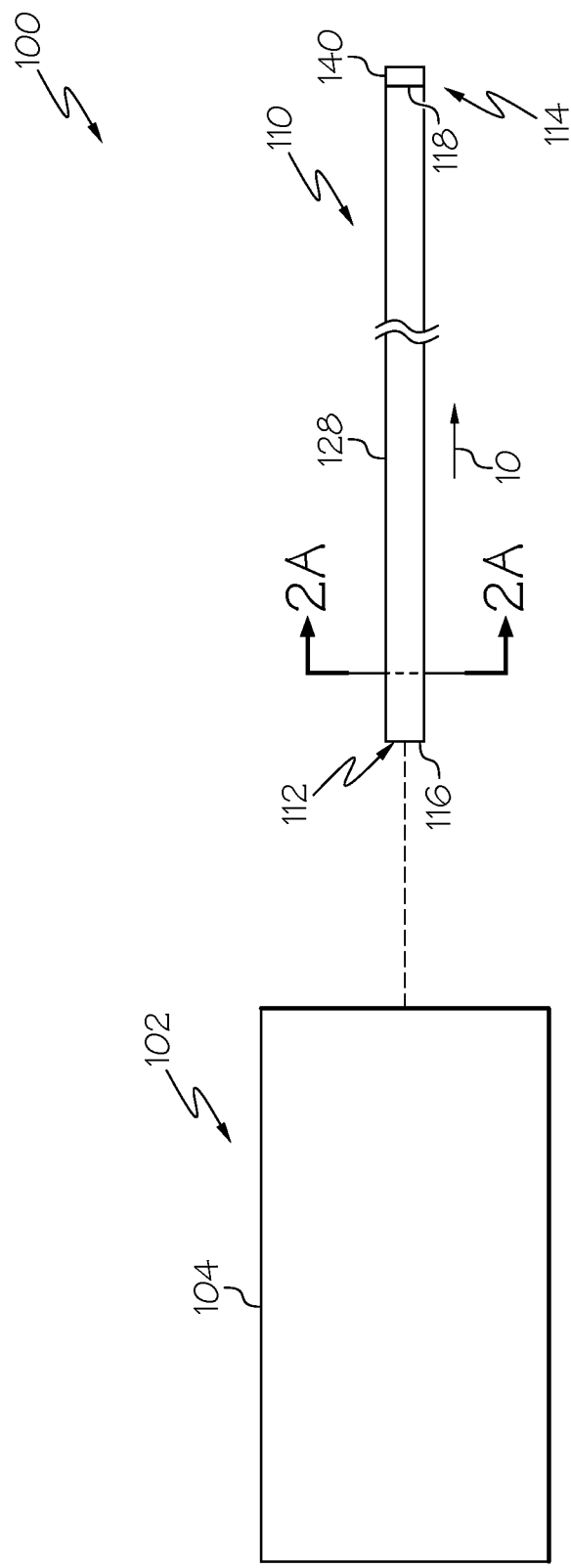
FIG. 1 schematically depicts an illumination system comprising a light diffusing optical fiber having a first end optically coupled to a light output device and a second end having a metallized mirror coating disposed thereon, according to one or more embodiments shown and described herein.
Figure 2A:
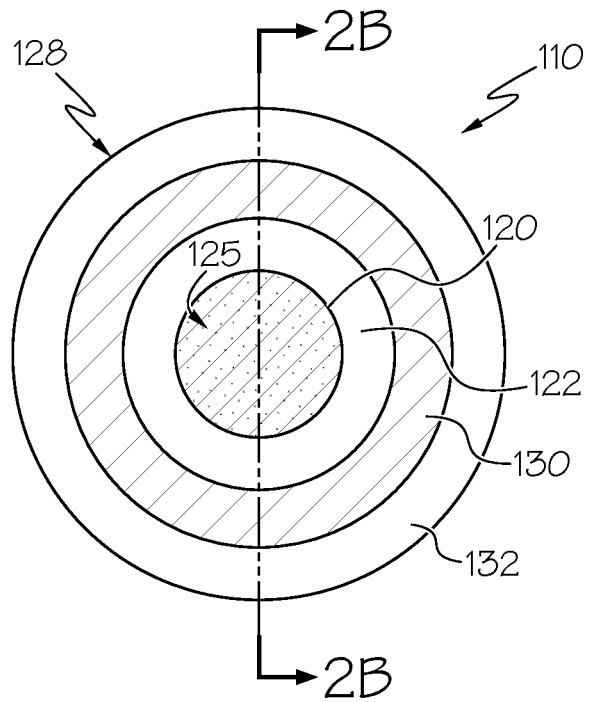
FIG. 2A schematically depicts a cross section of a light diffusing optical fiber of FIG. 1, according to one or more embodiments shown and described herein.
Figure 2B:
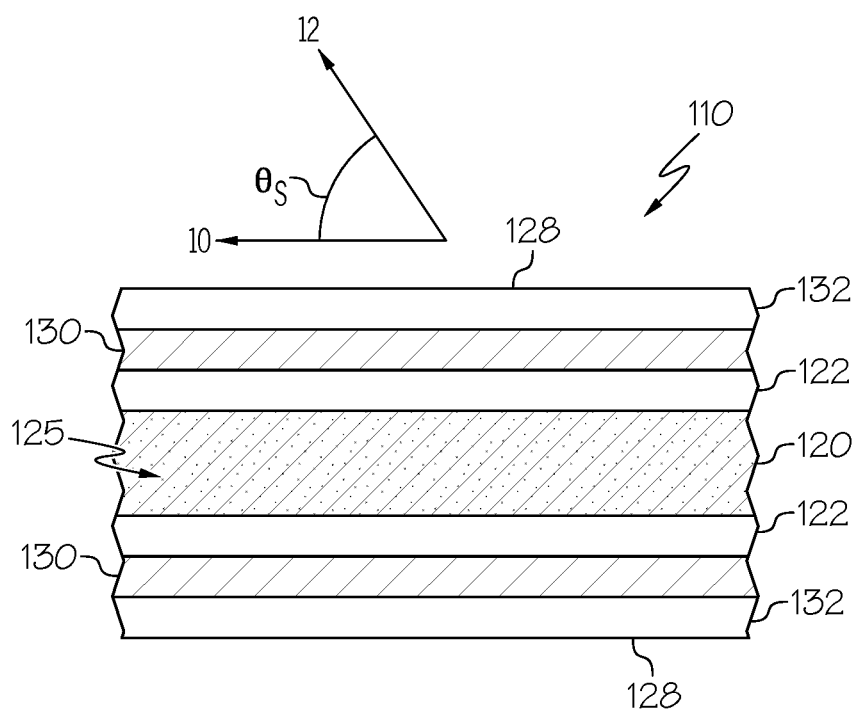
FIG. 2B schematically depicts another cross section of a light diffusing optical fiber of FIGS. 1 and 2A, according to one or more embodiments shown and described herein.

Referring now to FIGS. 1-2B, an illumination system 100 comprises a light diffusing optical fiber 110 optically coupled to a light output device 102 that includes a light source 104. The light diffusing optical fiber 110 comprises a first end 112 having an end face 116, a second end 114 having an end face 118, a core 120, a polymer cladding 122 surrounding the core 120, an outer surface 128, and a plurality of scattering structures 125 positioned within the core 120, the polymer cladding 122, or both the core 120 and the polymer cladding 122 (e.g., at a core-cladding boundary). The plurality of scattering structures 125 are configured to scatter guided light (e.g., light output by the light output device 102 that is propagating along the light diffusing optical fiber 110) toward the outer surface 128 of the light diffusing optical fiber 110 such that a portion of the guided light diffuses through the outer surface 128 along a length of the light diffusing optical fiber 110. Further, the illumination system 100 comprises a metallized mirror coating 140 disposed onto the end face 118 of the second end of the light diffusing optical fiber 110.

As used herein, the term "light-diffusing" means that light scattering is substantially spatially continuous along at least a portion of the length of the light diffusing optical fiber 110, i.e., there are no substantial jumps or discontinuities such as those associated with discrete (e.g., point) scattering. Thus, the concept of substantially continuous light emission or substantially continuous light scattering as set forth in the present disclosure refers to spatial continuity. As also used herein, "diffusion length," is the length of the light diffusing optical fiber 110 extending from the first end 112 of the light diffusing optical fiber 110 (or from any end receiving input light) to a location along the length of the light diffusing optical fiber 110 where 90% of the guided light has diffused from the light diffusing optical fiber 110. Further, as used herein, "uniform illumination" refers to illumination along the length of the light diffusing optical fiber 110 in which the intensity of light emitted from the light diffusing optical fiber 110 does not vary by more than 25% over the specified length.

As depicted in FIG. 1, the light output device 102 is optically coupled to the first end 112 of the light diffusing optical fiber 110 such that light output by the light source 104 of the light output device 102 may irradiate the end face 116 of the first end 112 of the light diffusing optical fiber 110 and enter the light diffusing optical fiber 110. The light source 104 may comprise a light-emitting diode (LED), a laser diode, such as a multimode laser diode, single mode laser diode, a SiP laser diode, a VCSEL laser diode, or another type of semiconductor laser diode, or the like. The light source 104 may be configured to generate light in the 200 nm to 2000 nm wavelength range. For example, the light source 104 may be an ultraviolet (UV) or near UV light source configured to emit light at a wavelength of from about 300 nm to about 550 nm, for example, about 300 nm, 325 nm, 350 nm, 375 nm, 400 nm, 405 nm, 415 nm, 425 nm, 435 nm, 445 nm, 450 nm, 475 nm, 500 nm, 525 nm, 550 nm or the like, such as about 300 nm to about 460 nm. Further, in some embodiments, the light source 104 may be a visible light source configured to emit light at a wavelength of from about 400 nm to about 700 nm, for example, about 425 nm, 440 nm, 450 nm, 475 nm, 500 nm, 525 nm, 550 nm, 575 nm, 600 nm, 625 nm, 650 nm, 670 nm, 675 nm, or the like. The light output device 102 may further comprise additional optical components such a lens, an optical delivery fiber, or the like, positioned between and optically coupled to the light source 104 and the first end 112 of the light diffusing optical fiber 110 to facilitate the input of light into the light diffusing optical fiber 110. Moreover, these additional optical components, such as an optical delivery fiber, may allow the light source 104 to be spatially separated from the light diffusing optical fiber 110.

In operation, because light emitted by the light source 104 is scattered into the surrounding environment by the light diffusing optical fiber 110, the light source 104 may be positioned at a location remote from the light diffusing optical fiber 110. Accordingly, any thermal heat generated by the light source 104 may be transferred away from the light source 104 to locations remote from both the light source 104 and the light diffusing optical fiber 110. Thus, the temperature of the light diffusing optical fiber 110 may remain substantially similar to the ambient temperature of the surrounding environment and the lighting unit may be described as a thermally "cool" lighting unit. Further, spatially separating the light diffusing optical fiber 110 and the light source 104 may provide additional design flexibility to the illumination system 100.

Referring now to FIGS. 2A and 2B, cross sections of an embodiment of the light diffusing optical fiber 110 comprising the core 120, the polymer cladding 122 surrounding the core 120, the outer surface 128 and the plurality of scattering structures 125 are depicted. The core 120 may be a glass core, for example, silica, germania doped silica, fluorine-doped silica, or a polymer core, such as a low index polymer. The polymer cladding 122 may comprise a low index polymer such as UV or thermally curable fluoroacrylate or silicone. The polymer cladding 122 may have a low refractive index to provide a high numerical aperture (NA). As one example, the polymer cladding 122 may comprise a UV curable silicone having a refractive index of 1.413 available from Dow-Corning of Midland, Mich. under product name Q3-6696) which, in conjunction with a glass core, may result in a light diffusing optical fiber having a NA of about 0.3. The polymer cladding 122 comprises a depressed index relative to the core 120. For example, the polymer cladding 122 may comprise a relative refractive index (with respect to the core 120) that is negative, for example, about −0.5% or less, about −1% or less, or the like.

In some embodiments, the core 120, the polymer cladding 122, or both may include an updopant or a downdopant. As used herein, an "updopant" is a dopant which has a propensity to raise the refractive index relative to pure undoped silica and a "downdopant" is a dopant which has a propensity to lower the refractive index relative to pure undoped silica. The core may comprise a diameter of about 25 µm to about 500 µm, for example, about 30 µm, 40 µm, 50 µm, 75 µm, 100 µm, 125 µm, 150 µm, 175 µm, 200 µm, 225 µm, 250 µm, 275 µm, 300 µm, 325 µm, 350 µm, 375 µm, 400 µm, 425 µm, 450 µm, 475 µm, or the like. The polymer cladding 122 may comprise a thickness of about 10 µm or more, about 20 µm or more, or the like. Further, the polymer cladding 122 may comprise an outer diameter of about 50 µm to about 600 µm, for example, about 60 µm, 75 µm, 100 µm, 125 µm, 150 µm, 175 µm, 200 µm, 250 µm, 300 µm, 350 µm, 400 µm, 450 µm, 500 µm, 550 µm, or the like. Moreover, the light diffusing optical fiber 110 will may comprise a length (e.g., a length between the first end 112 and the second end 114) of from about 0.15 m to about 100 m, for example, about 100 m, 75 m, 50 m, 40 m, 30 m, 20 m, 10 m, 9 m, 8 m, 7 m, 6 m, 5 m, 4 m, 3 m, 2 m, 1 m, 0.75 m, 0.5 m, 0.25 m, 0.15 m, or 0.1 m.

Referring still to FIGS. 2A and 2B, the scattering structures 125 may comprise gas filled voids, scattering particles, such as ceramic materials and dopants, or the like. The scattering structures 125 may occur throughout the core 120 (as depicted in FIGS. 2A and 2B), or may occur near the interface of the core 120 and the polymer cladding 122 (e.g., the core-cladding boundary), or may occur in an annular ring within the core 120. Some examples of light-diffusing optical fibers having randomly arranged and randomly sized gas filled-voids (also referred to as "random air lines" or "nanostructures" or "nano-sized structures") are described in U.S. Pat. No. 7,450,806, and in U.S. patent application Ser. Nos. 12/950,045, 13/097,208, and 13/269,055, herein incorporated by reference in their entirety. Alternatively, the light diffusing optical fiber 110 may have a "roughened" core 120, where the irregularities on the surface of the core 120 at the core-cladding boundary causes light scatter. Other types of light diffusing optical fibers may also be utilized. In operation, the light diffusing optical fiber 110 may undergo scattering-induced attenuation (i.e., attenuation due to light lost through the outer surface 128 of the light diffusing optical fiber 110, not due to absorption of scattering particles within the core 120) about 50 dB/km or greater, for example from about 100 dB/km to about 60000 dB/km at an illumination wavelength (e.g., the wavelength(s) of emitted radiation).

In embodiments in which the scattering structures 125 comprise gas filled voids, the gas filled voids may be arranged in a random or organized pattern and may run parallel to the length of the light diffusing optical fiber 110 or may be helical (i.e., rotating along the long axis of the light diffusing optical fiber 110). Further, the light diffusing optical fiber 110 may comprise a large number of gas filled voids, for example more than 50, more than 100, or more than 200 voids in the cross section of the fiber. The gas filled voids may contain, for example, $SO_2$, Kr, Ar, $CO_2$, $N_2$, $O_2$, or mixtures thereof. However, regardless of the presence or absence of any gas, the average refractive index in region of the core 120, the polymer cladding 122, or the core-cladding boundary that comprises the plurality of scattering structures 125 is lowered due to the presence of voids or other scattering structures. Further, the plurality of scattering structures 125 such as the gas filled voids can be randomly or non-periodically disposed in the core 120, the polymer cladding 122, or the core-cladding boundary, however, in other embodiments the gas filled voids may be periodically disposed.

The cross-sectional size (e.g., diameter) of the gas filled voids (or other scattering structures) may be from about 10 nm to about 10 µm and the length may vary from about 1 µm to about 50 m. In some embodiments, the cross sectional size of the voids (or other scattering particles) is about 10 nm, 20 nm, 30 nm, 40 nm, 50 nm, 60 nm, 70 nm, 80 nm, 90 nm, 100 nm, 120 nm, 140 nm, 160 nm, 180 nm, 200 nm, 250 nm, 300 nm, 400 nm, 500 nm, 600 nm, 700 nm, 800 nm, 1 µm, 2 µm, 3 µm, 4 µm, 5 µm, 6 µm, 7 µm, 8 µm, 9 µm, or 10 µm. In some embodiments, the length of the voids is about 1 µm, 2 µm, 3 µm, 4 µm, 5 µm, 6 µm, 7 µm, 8 µm, 9 µm, 10 µm, 20 µm, 30 µm, 40 µm, 50 µm, 60 µm, 70 µm, 80 µm, 90 µm, 100 µm, 200 µm, 300 µm, 400 µm, 500 µm, 600 µm, 700 µm, 800 µm, 900 µm, 1000 µm, 5 mm, 10 mm, 50 mm, 100 mm, 500 mm, 1 m, 5 m, 10 m, 20 m, or 50 m.

Referring still to FIGS. 2A and 2B, the light diffusing optical fiber 110 may further comprise one or more additional layers, for example, coatings, jackets, or the like. For example, as depicted in FIGS. 2A and 2B, the light diffusing optical fiber 110 may comprise a primary coating layer 130 and a secondary scattering layer 132. The primary coating layer 130 may comprise a substantially clear layer surrounding the core 120 and the polymer cladding 122 for ease of mechanical handling, for example, a polymer coating. Further, the secondary scattering layer 132 may be positioned surrounding the core 120, the polymer cladding 122, and in some embodiments, the primary coating layer 130. The secondary scattering layer 132 may comprise a base material (for example, a polymer) and a scattering material positioned in the base material. In operation, the secondary scattering layer 132 may facilitate uniform angular scattering over a large angular range (e.g., 40 to 120°, or 30° to 130°, or 15 to 150°). For example, the light diffusing optical fiber 110 is configured to provide substantially uniform illumination due to scattering, such that the difference between the minimum and maximum scattering illumination intensity is less than 50% of the maximum scattering illumination intensity, for all viewing angles between 40 and 120 degrees.

In some embodiments, the scattering material may comprise a sublayer within the secondary scattering layer 132. For example, in some embodiments, the sublayer may have a thickness of about 1 µm to about 5 µm. In other embodiments, the thickness of the particle sublayer and/or the concentration of the scattering material (e.g., scattering particles) in the secondary scattering layer 132 may be varied along the axial length of the light diffusing optical fiber 110 so as to provide more uniform variation in the intensity of light scattered from the light diffusing optical fiber 110 at large angles (i.e., angles greater than about 15 degrees). For example, the angular illumination for all viewing angles between 40 and 120 degrees is within 50% of maximum illumination, and in some embodiments within 30%. In some embodiments, the angular illumination for all viewing angles between 40 and 120 degrees is within 30% of maximum illumination, and in some embodiments within 25%.

In some embodiments the scattering material within the secondary scattering layer 132 could be any scattering material that has a refractive index differential from the base material of the secondary scattering layer 132 (e.g. a base polymer) of more than 0.05 (e.g., the difference in refractive indices between the base material and the scattering material is greater than 0.05). In some embodiments, the difference in refractive indices between base material and the scattering material is at least 0.1. That is, the index of refraction of the scattering material may be at least 0.1 larger than the index of refraction of the base material (e.g., of the polymer or other matrix material) of the secondary scattering layer 132. The scattering material can be solid particles (e.g., organic or inorganic solid particles), liquid droplets, or gas bubbles. Example solid organic particles include pigments, polymers, or any organic material that can be incorporated into the base material as a powder. Further, scattering particles may be generated in-situ, via crystallization and/or phase separation, for example, polyethylene, polypropylene, syndiotactic polystyrene, nylon, polyethylene terephthalate, polyketones, and polyurethanes where the urethane functional groups align and crystallize during solidification. For example, during the cure or solidification of the material that becomes the secondary scattering layer 132, crystals may form that function as light scattering sites. Further, when the secondary scattering layer 132 is cured and/or solidified, the material of the scattering layer (e.g., the base material and the scattering material) may because incompatible causing the material to phase separate, forming droplets or particles that can scatter light, thus forming scattering sites. Examples of these include, but are not limited to, styrene-butadiene-styrene block copolymers, polymethyl methacrylate in polystyrene, and acrylonitrile-butadiene-styrene.

If the scattering material is inorganic, the scattering particles can be, for example, pigments, oxides, or mineral fillers. Both organic and inorganic scattering particles can be generated, from grinding a solid, or may comprise small particles initially (for example, from emulsion polymerization or solgels). In some embodiments, the solid scattering particles are inorganic oxides like silica, alumina, zirconia, titania, cerium oxide, tin oxide, and antimony oxide. Ground glass, ceramics, or glass-ceramics can also be utilized as scattering particles. Ground silicates or mineral fillers like quartz, talc, mullite, cordierite, clay, nepheline syenite, calcium carbonate, aluminum trihydrate, barium sulfate, wallastonite, mica, feldspar, pyrophyllite, diatomite, perlite, and cristobalite can utilized in the secondary scattering layer 132 as scattering particles, to provide the uniform angular illumination intensity of the diffused light.

In embodiments in which the scattering material comprises scattering particles, the cross-sectional size of the scattering particles within the secondary scattering layer 132 may comprise 0.1λ to 10λ, where λ is the wavelength of light propagating through the light diffusing optical fiber 110. In some embodiments, the cross-sectional size of the scattering particles is greater than 0.2λ and less than 5λ, for example, between 0.5λ, and to 2λ. The amount of scattering particles can vary from about 0.005% to 70% by weight, for example, 0.01% to 60%, 0.02% to 50%, or the like. In general, the thinner the secondary scattering layer 132, the larger amount of scattering particles should to be present within that secondary scattering layer 132.

Referring now to FIG. 2B, unscattered, guided light propagates along the light diffusing optical fiber 110 from the light output device 102 in the direction shown by arrow 10. Scattered light is shown exiting the light diffusing optical fiber 110 in the direction shown by arrow 12 at a scattering angle θs, which is the angular difference between the propagation direction 10 of guided light propagating along the light diffusing optical fiber 110 and the direction 12 of the scattered light when it leaves light diffusing optical fiber 110. In some embodiments, the intensities of the spectra when the scattering angle θs is between 15° and 150°, or 30° and 130° are within ±50%, ±30%, ±25%, ±20%, ±15%, ±10%, or ±5% as measured at the peak wavelength. In some embodiments, the intensities of the spectra when the scattering angle θs is between all angles within 30° and 130°, or 40° and 120° are at least within ±50%, for example ±30%, ±25%, ±20%, ±15%, ±10%, or ±5% as measured at the peak wavelength. Accordingly, the light diffusing optical fiber 110 is configured to provide substantially uniform illumination due to scattering, such that the difference between the minimum and maximum scattering illumination intensity is less than 50% of the maximum scattering illumination intensity, for all viewing angles between at least 40 degrees and 110 degrees, for example for all viewing angles between 40 degrees and 120 degrees. According to some embodiments, the difference between the minimum and maximum scattering illumination intensity is not greater than 30% of the maximum scattering illumination intensity.

Referring still to FIGS. 2A and 2B, the light diffusing optical fiber 110 may have a scattering induced attenuation loss of greater than about 0.2 dB/m at a wavelength of 550 nm. For example, in some embodiments, the scattering induced attenuation loss (attenuation loss due to the scattering structures 125, such as air lines) may be greater than about 0.5 dB/m, 0.6 dB/m, 0.7 dB/m, 0.8 dB/m, 0.9 dB/m, 1 dB/m, 1.2 dB/m, 1.4 dB/m, 1.6 dB/m, 1.8 dB/m, 2.0 dB/m, 2.5 dB/m, 3.0 dB/m, 3.5 dB/m, or 4 dB/m, 5 dB/m, 6 dB/m, 7 dB/m, 8 dB/m, 9 dB/m, 10 dB/m, 20 dB/m, 30 dB/m, 40 dB/m, or 50 dB/m at 550 nm. In some embodiments, the average scattering loss of the light diffusing optical fiber 110 is greater than 50 dB/km, and the scattering loss does not vary more than 20% (i.e., the scattering loss is within ±20% of the average scattering loss, for example within ±15%, or within ±10%) over any given fiber segment of the light diffusing optical fiber 110. In some embodiments, the average scattering loss of the light diffusing optical fiber 110 is greater than 50 dB/km, and the scattering loss does not vary more than 20% (i.e., the scattering loss is within ±20% of the average scattering loss, for example within ±15%, or even within ±10%) over any given fiber segment of the light diffusing optical fiber 110 of from about 0.2 m to about 50 m, for example, 0.5 m, 1 m, 2 m, 5 m, 10 m, 15 m, 20 m, 25 m, 30 m, 35 m, 40 m, 45 m, or the like.

Referring again to FIG. 1, the metallized mirror coating 140 is disposed onto the end face 118 of the second end 114 of the light diffusing optical fiber 110. In particular, the metallized mirror coating 140 may be directly disposed (e.g., bonded) to the core 120 and the polymer cladding 122 at the end face 118 of the second end 114. Further, in embodiments comprising additional coating layers (such as the primary coating layer 130 and the secondary scattering layer 132) the metallized mirror coating 140 may also be directly disposed (e.g., bonded) to the primary coating layer 130 and/or the secondary scattering layer 132 at the end face 118 of the second end 114 of the light diffusing optical fiber 110. In some embodiments, the end face 118 of the second end 114 may comprise a diameter of from about 50 μm to about 800 μm, for example, from about 100 μm to about 500 μm, from about 100 μm to about 200 μm, or the like, for example, about 75 μm, 100 μm, 125 μm, 150 μm, 175 μm, 200 μm, 225 μm, 250 μm, 300 μm, 350 μm, 400 μm, 450 μm, 500 μm, 550 μm, 600 μm, 650 μm, 700 μm, 750 μm, or the like.

The metallized mirror coating 140 comprises a reflective metal material and is configured to reflect at least a portion of the guided light that reaches the second end 114 of the light diffusing optical fiber 110 (e.g., guided light that does not diffuse outward through the outer surface 128) toward the first end 112 of the light diffusing optical fiber 110 such that at least a portion of the reflected light diffuses through the outer surface 128. The reflective metal material of the metallized mirror coating 140 may comprise gallium, lithium, indium, aluminum, silver, or the like, and in some embodiments, the reflective metal material of the metallized mirror coating 140 may comprise a metal alloy, such as gallium alloyed with indium, aluminum, lithium, silver, or combinations thereof.

Further, the metallized mirror coating 140 may comprise a thickness of from about 1 μm to about 125 μm, for example, about 5 μm, 10 μm, 25 μm, 50 μm, 75 μm, 100 μm, or the like. As used herein, the thickness of the metallized mirror coating 140 refers to the dimension extending outward from the end face 118 of the second end 114, e.g., away from the core 120 and the polymer cladding 122 of the light diffusing optical fiber 110. In operation, when the light source 104 emits light which enters the first end 112 of the light diffusing optical fiber 110 and propagates as guided light along the core 120 of the light diffusing optical fiber 110, the metallized mirror coating 140 reflects at least a portion of the guided light that reaches the end face 118 of the second end 114 back toward the first end 112. For example, the metallized mirror coating 140 may reflect 70% or more of the guided light that reaches the end face 118 of the second end 114 of the light diffusing optical fiber 110, for example 75%, 80%, 85%, 90%, 95%, 97%, 99%, or the like. In other words, the metallized mirror coating 140 may comprise a reflection percentage of from about 70% to about 99%. As used herein, the "reflection percentage" refers to the percentage of guided light that reaches the end face 118 of the second end 114 that is reflected at the glass-metal interface of the core 120 and the metallized mirror coating 140 (and is not absorbed or otherwise attenuated at the glass-metal interface of the core 120 and the metallized mirror coating 140).

Figure 3A:
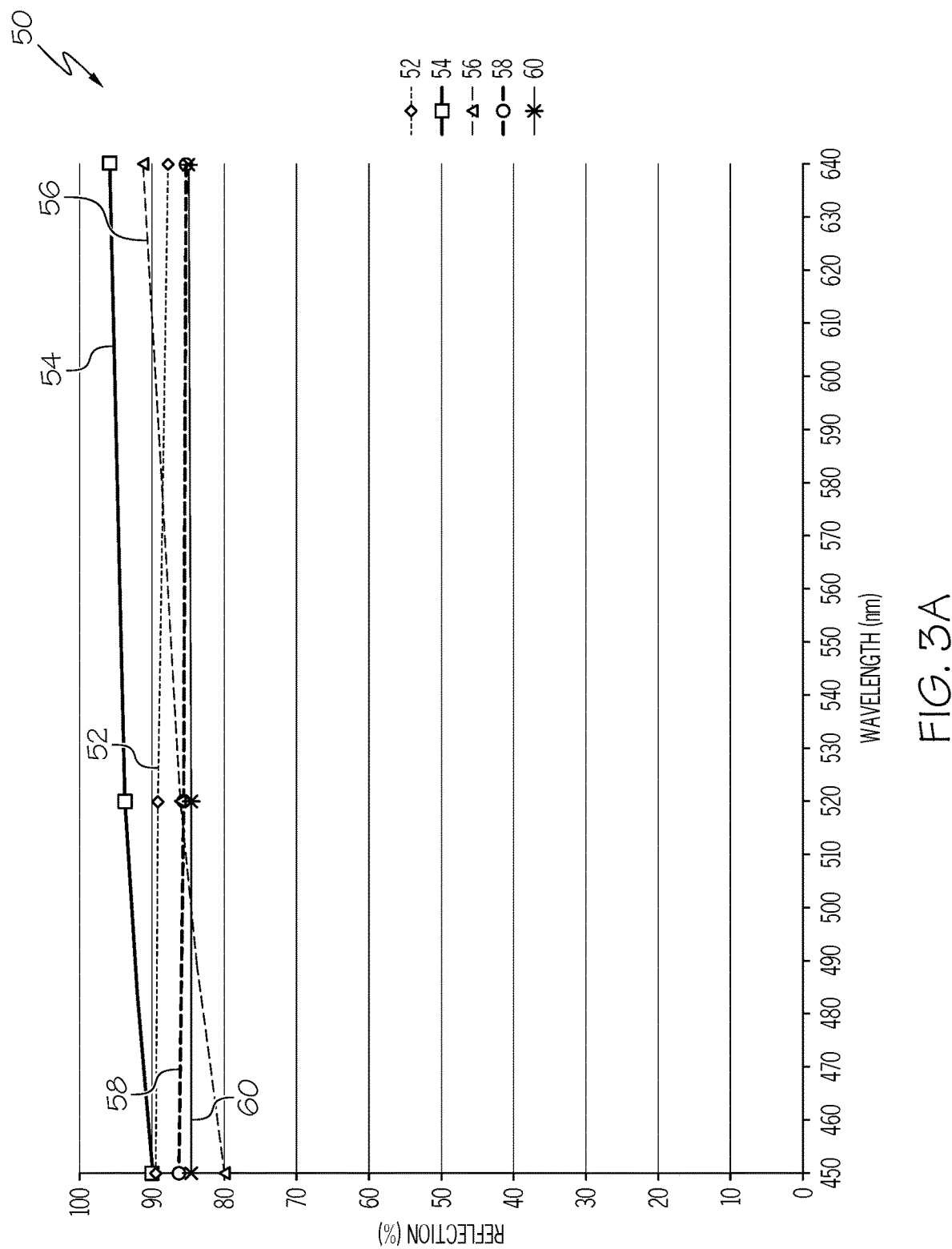
FIG. 3A graphically depicts the reflection percentage of a metallized mirror coating comprising a variety of materials, according to one or more embodiments shown and described herein.

Referring now to FIG. 3A, a graph 50 depicts the reflection percentage of different metal materials of the metallized mirror coating 140 at the end face 118 of the second end 114 of the light diffusing optical fiber 110 for light comprising a wavelength of from about 450 nm to about 640 nm. Line 52 shows that a metallized mirror coating 140 comprising aluminum has a reflection percentage of about 85% or more at the glass-metal interface. Line 54 shows that a metallized mirror coating 140 comprising silver has a reflection percentage of about 90% or more at the glass-metal interface. Line 56 shows that a metallized mirror coating 140 comprising lithium has a reflection percentage of about 80% or more at the glass-metal interface. Line 58 shows that a metallized mirror coating 140 comprising gallium has a reflection percentage of about 85% or more at the glass-metal interface. Further, line 60 shows that a metallized mirror coating 140 comprising indium has a reflection percentage of about 85% or more at the glass-metal interface.

While not intending to be limited by theory, by reflecting guided light that reaches the end face 118 of the second end 114 back towards the first end 112, at least a portion of this reflected light may diffuse through the outer surface 128, thereby increasing the total percentage of the light that enters the light diffusing optical fiber 110 (e.g., light output by the light source 104) which diffuses through the outer surface 128 of the light diffusing optical fiber 110. Further, while still not intending to be limited by theory, reflecting guided light using the metallized mirror coating 140 may increase the length of illumination (and in some embodiments, may increase uniform illumination) of the light diffusing optical fiber 110. Further, reflecting guided light using the metallized mirror coating 140 may also reduce the amount of laser power needed to achieve various levels of brightness.

Figure 3B:
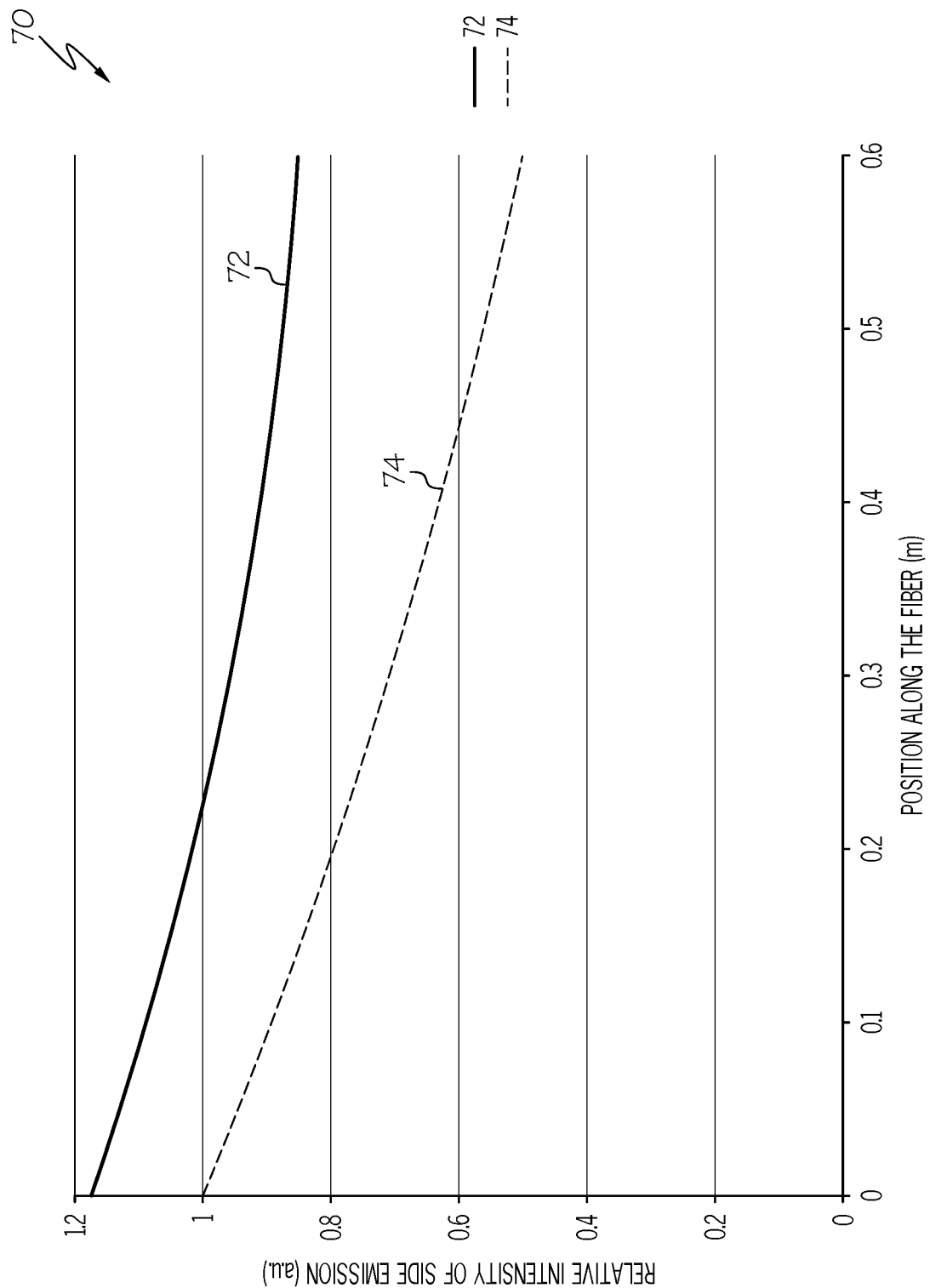
FIG. 3B graphically depicts the relative intensity of light diffusing through an outer surface of a light diffusing optical fiber with and without a metallized mirror coating disposed on an end of the light diffusing optical fiber, according to one or more embodiments shown and described herein.

Referring now to FIG. 3B, a graph 70 depicts the relative intensity of light diffusing through the outer surface 128 along the length of an example light diffusing optical fiber 110, when an example metallized mirror coating 140 is disposed on the second end 114 (line 72) and when the example metallized mirror coating 140 is not disposed on the second end 114 (line 74). The example metallized mirror coating 140 comprises a reflection percentage of 70%, the length of the light diffusing optical fiber 110 is such that about 50% of the guided light would exit the second end 114 of the light diffusing optical fiber 110 without the metallized mirror coating 140 and the length of the light diffusing optical fiber 110 is about 30% of the diffusion length of the light diffusing optical fiber 110. As shown by line 74, without the metallized mirror coating 140, the intensity of light diffusing through the outer surface 128 varies by a factor of about 2 along the length of the light diffusing optical fiber and about 50% of the guided light diffuses through the outer surface 128. As shown by line 72, by disposing the example metallized mirror coating 140 with a reflection percentage of 70%, the intensity of light diffusing through the outer surface 128 varies by a factor of about 1.3 along the physical length of the light diffusing optical fiber (i.e. the metallized mirror coating 140 increases the uniformity of illumination) and about 67.4% of the guided light diffuses through the outer surface 128 (i.e. the metallized mirror coating 140 increases the brightness).

Referring again to FIGS. 1-3B, in some embodiments, a melting point of the metallized mirror coating 140 is greater than an equilibrium operating temperature of the light diffusing optical fiber 110. As used herein, "equilibrium operating temperature" comprises the temperature of the light diffusing optical fiber 110 when guided light is propagating along the core 120 of the light diffusing optical fiber 110 for a period of time long enough to reach thermal equilibrium. Thus, the metallized mirror coating 140 does not deform or melt when guided light reflects off the metallized mirror coating 140. For example, the equilibrium operating temperature of the light diffusing optical fiber 110 may comprise about 80° C. or less.

Further, in embodiments in which the metallized mirror coating 140 is applied to the end face 118 of the second end 114 by dipping the end face 118 into a heated metal solution 144 using an immersion deposition assembly 200, as described in more detail below with respect to FIG. 4, the melting point of the metallized mirror coating 140 is less than a damage threshold of the polymer cladding 122 (and in some embodiments, a damage threshold of the primary coating layer 130 and the secondary scattering layer 132). This allows the end face 118 of the second end 114 of the light diffusing optical fiber 110 to be immersed in the heated metal solution 144 without damaging the plastic and/or polymer coatings of the light diffusing optical fiber 110 (e.g., the polymer cladding 122, the primary coating layer 130, and the secondary scattering layer 132). Thus, these layers do not need to be removed before immersing the end face 118 of the second end 114 of the light diffusing optical fiber 110 in the heated metal solution 144.

Moreover, because the light diffusing optical fiber 110 comprises a polymer cladding (e.g., the polymer cladding 122), if removal of the polymer cladding 122 at the second end 114 were required, a portion of the metallized mirror coating 140 would be bonded to the sides of core 120 extending a distance from the second end 114 toward the first end 112. Because the metallized mirror coating 140 is not 100% reflective, additional guided light would be absorbed along the sides of the core 120 coated with the metallized mirror coating 140. However, because the polymer cladding 122 does not need to be removed at the second end 114, only the portion of the core 120 at the end face 118 of the second end 114 is coated with metallized mirror coating 140, minimizing the optical loss of guided light at the metallized mirror coating 140.

In some embodiments, the polymer cladding 122 may comprise a damage threshold of about 120° C. Thus, the metallized mirror coating 140 may comprise a melting point of from about 80° C. to about 120° C., for example, about 85° C., 90° C., 95° C., 100° C., 105° C., 110° C., 115° C., or the like, for example, a gallium alloy. In particular, a gallium-silver alloy comprising from about 94.2% to about 93.8% gallium and about 5.8% to about 6.6% silver may have a melting point of from about 80° C. to about 120° C. and a gallium-silver alloy comprising a mixture of about 93.8% gallium and 6.2% silver has a melting point of about 100° C. Further, a gallium-indium alloy comprising from about 25.5% to about 7.5% gallium and about 74.5% to about 92.5% indium may have a melting point of from about 80° C. to about 120° C. and a gallium-indium alloy having a mixture of about 85.5% indium and 14.5% gallium comprises a melting point of about 100° C. However, as described in more detail below, in embodiments in which the metallized mirror coating 140 is applied to the end face 118 of the second end 114 via arc induced physical vapor deposition using an electrolytic deposition assembly 300, the melting point of the metallized mirror coating 140 may be greater than the damage threshold of the polymer cladding 122, the primary coating layer 130, and the secondary scattering layer 132.

Figure 4:
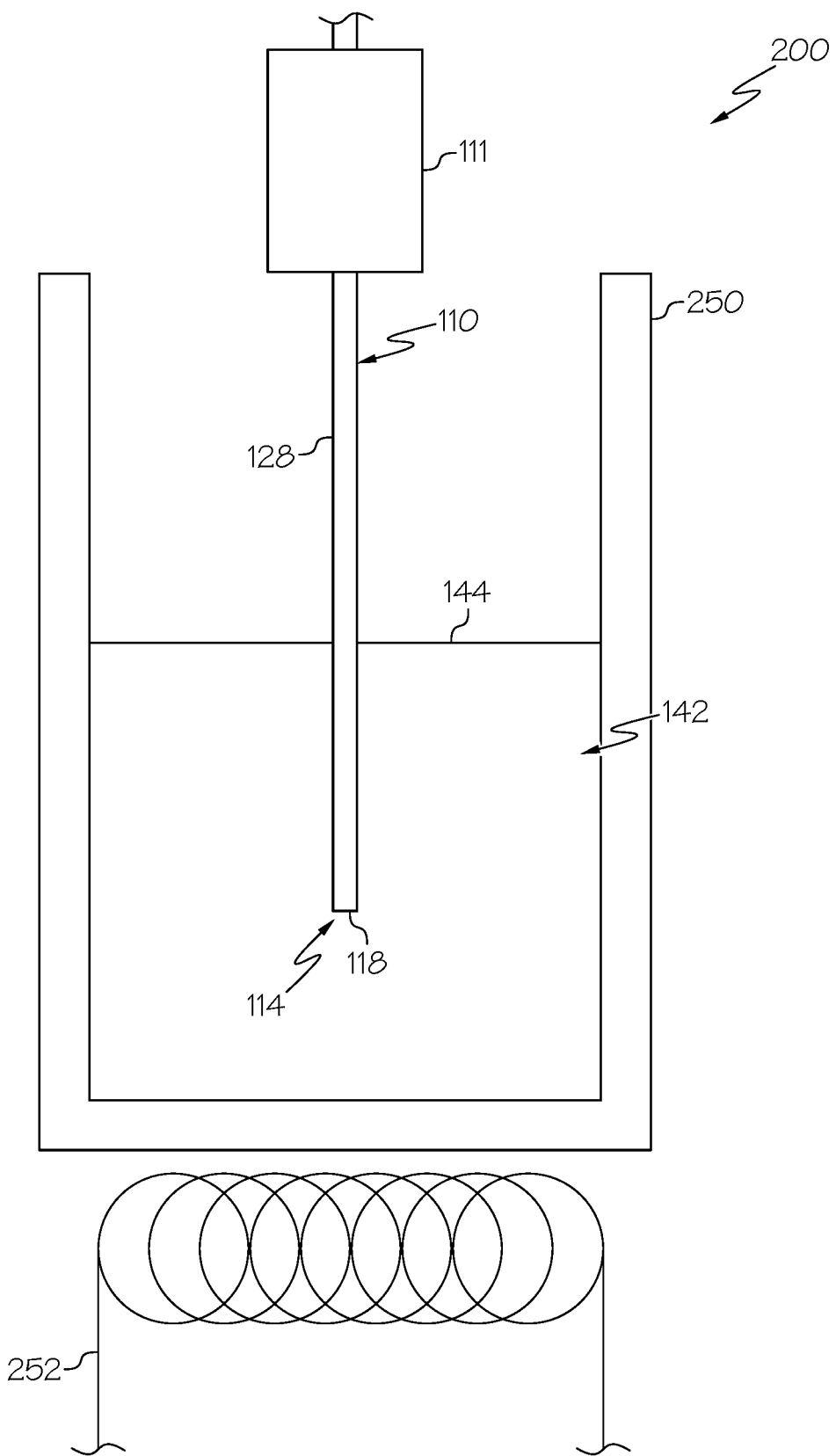
FIG. 4 schematically depicts an immersion deposition assembly for applying a metallized mirror coating on an end of a light diffusing optical fiber, according to one or more embodiments shown and described herein.
Figure 5A:
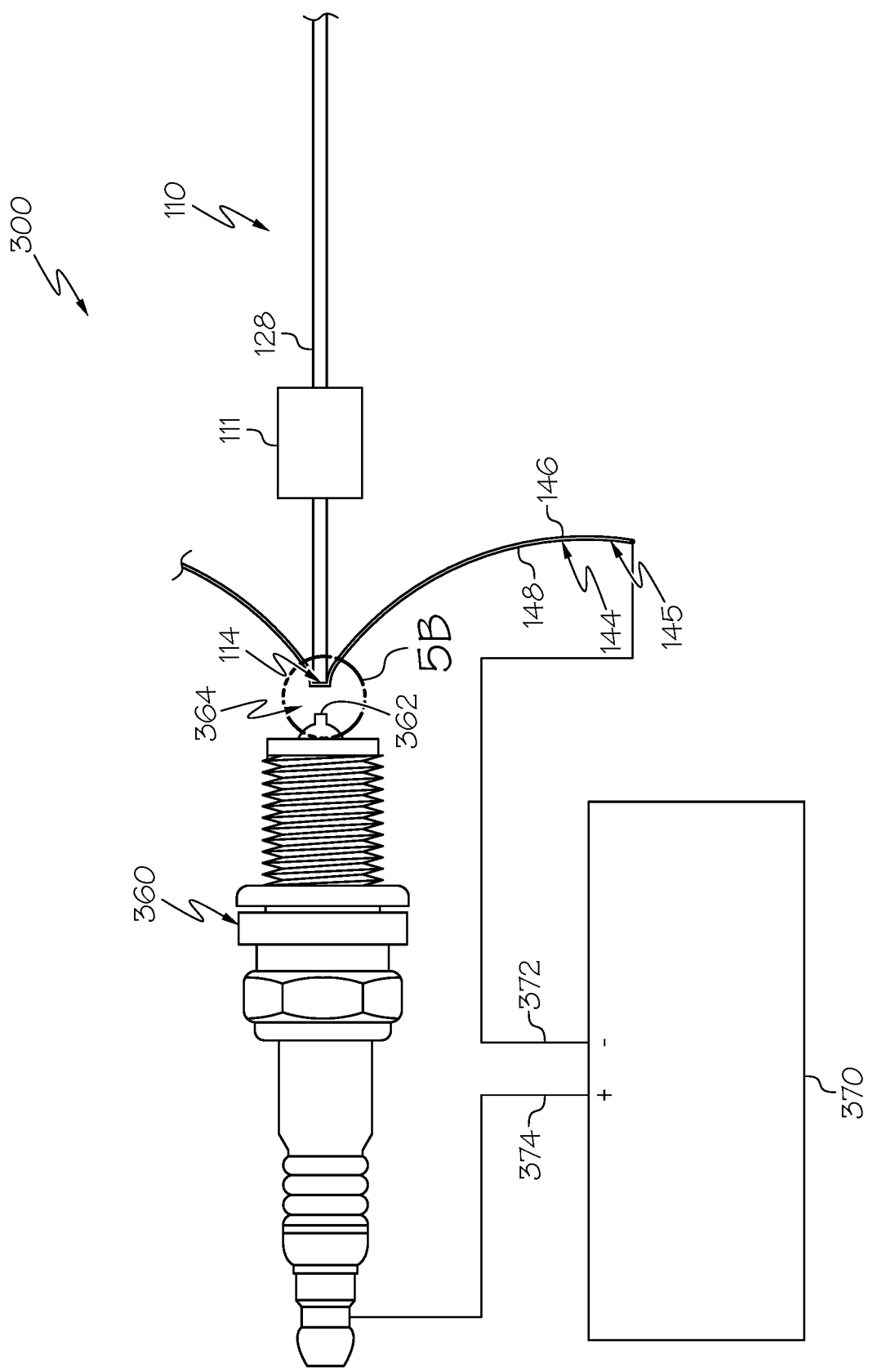
FIG. 5A schematically depicts an electrolytic deposition assembly for applying a metallized mirror coating on an end of a light diffusing optical fiber, according to one or more embodiments shown and described herein.
Figure 5B:
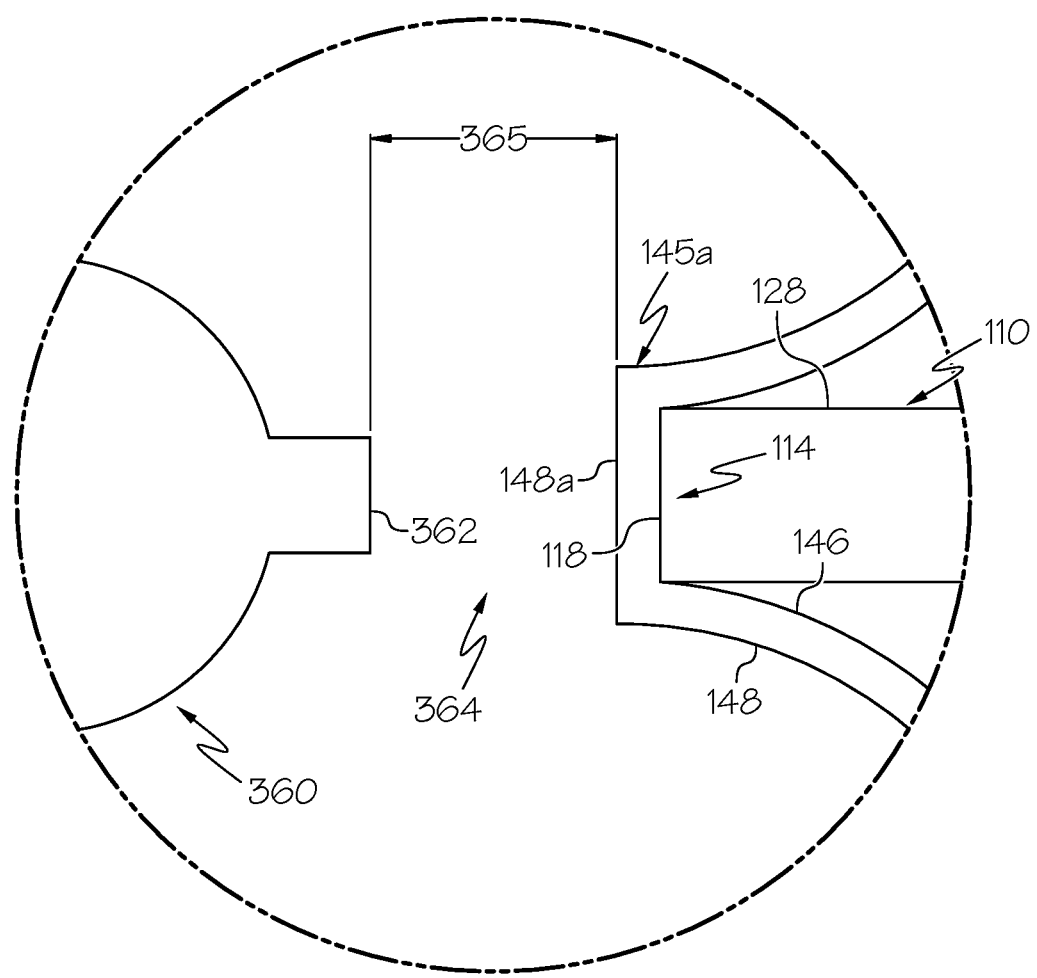
FIG. 5B schematically depicts a detailed view of a portion of the electrolytic deposition assembly of FIG. 5A, according to one or more embodiments shown and described herein.
Figure 6:
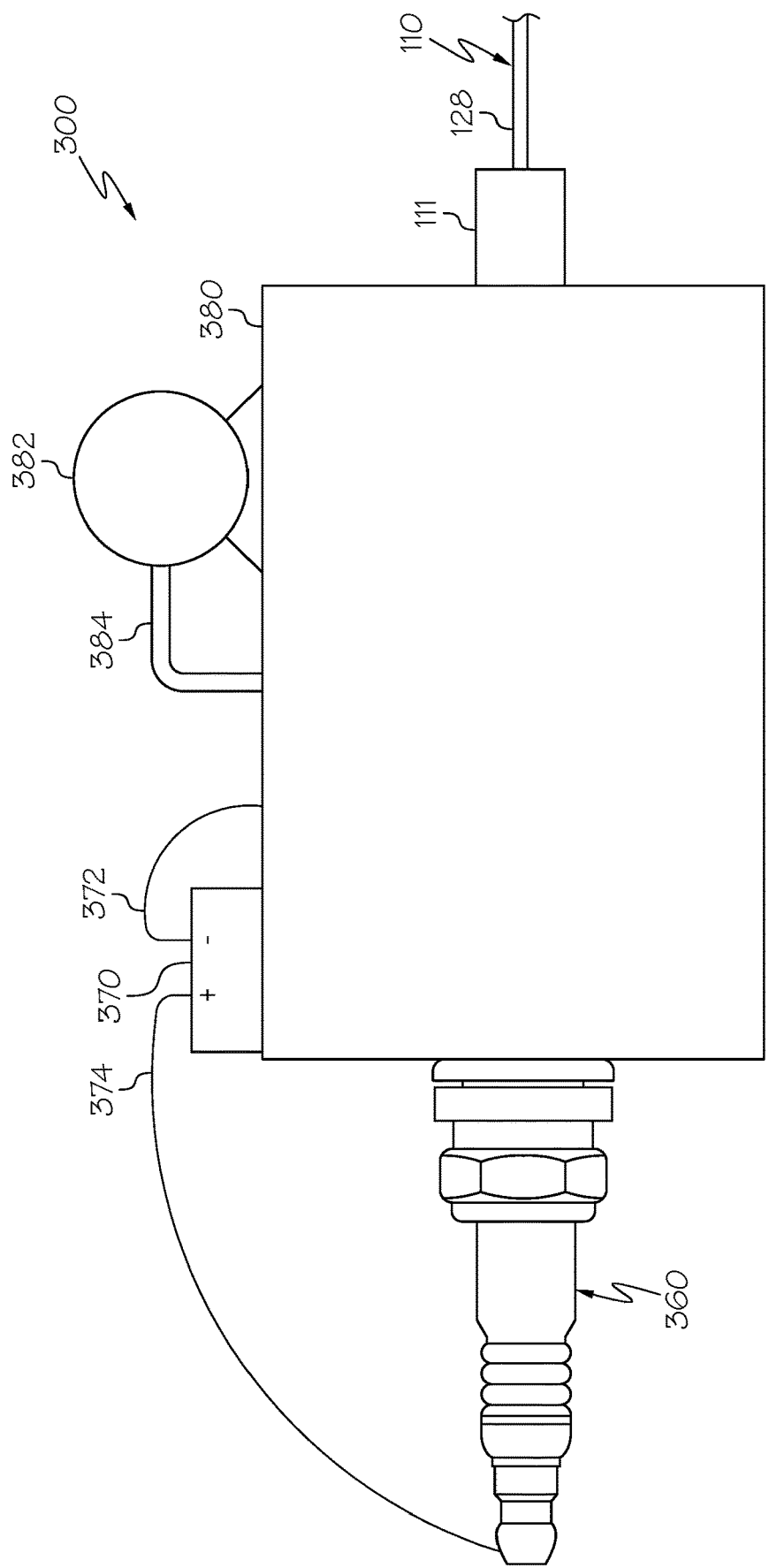
FIG. 6 schematically depicts the electrolytic deposition assembly of FIGS. 5A and 5B further comprising an anode housing, according to one or more embodiments shown and described herein.

Referring now to FIGS. 4-6, deposition assemblies (e.g., the immersion deposition assembly 200 of FIG. 4 and an electrolytic deposition assembly 300 of FIGS. 5A-6) for forming the metallized mirror coating 140 on the end face 118 of the second end 114 of the light diffusing optical fiber 110 are schematically depicted. Both the immersion deposition assembly 200 and the electrolytic deposition assembly 300 may be used to deposit a metallized mirror precursor 142 on the end face 118 and form the metallized mirror precursor 142 into the metallized mirror coating 140. In particular, the immersion deposition assembly 200 is configured to facilitate immersion (e.g., dipping) of the end face 118 into a metallized mirror precursor 142 comprising a metal solution 144 (e.g., a heated metal solution 144) and the electrolytic deposition assembly 300 is configured to facilitate physical vapor deposition of a metallized mirror precursor 142 comprising a metal sheet 145 onto the end face 118.

As depicted in FIG. 4, the immersion deposition assembly 200 comprises a solution container 250 for housing the metal solution 144 and a heating element 252 thermally coupled to the solution container 250. The heating element 252 is configured heat the metal solution 144 housed within the solution container 250 and may comprise an electric heating coil, a thermo-electric heating element, an indirect flame such as from a butane torch, or the like. The solution container 250 comprises a material having a melting point that is greater than a melting point of the metal solution 144, for example, the solution container 250 may comprise a ceramic material, a glass material, or the like. Further, the metal solution 144 may comprise a metal alloy, for example, gallium alloyed with indium, aluminum, lithium, silver, or a combination thereof. In particular, as the metal solution 144 forms the metallized mirror coating 140, the metal solution 144 may comprise any of the materials of the metallized mirror coating 140 described above. In particular, the metal solution 144 may comprise the materials described above having a melting point of from about 80° C. to about 120° C., such as a gallium-silver alloy, a gallium-indium alloy, or the like.

Referring now to FIGS. 5A and 5B, the electrolytic deposition assembly 300 comprises a metal anode 360 electrically coupled to a voltage source 370, for example, using a first electrical pathway 372 that extends between and electrically couples the metal anode 360 and the voltage source 370. The voltage source 370 is portable and may be battery powered. In some embodiments, the voltage source 370 may comprise a DC supply of a fixed, pre-determined voltage. In other embodiments, the voltage source 370 comprises a high energy, high voltage pulse generator. Further, the metal anode 360 may comprise an anode end 362 and, in operation, the voltage source 370 may provide a voltage signal to the metal anode 360 to initiate an arc discharge between the metal anode 360 (e.g., the anode end 362) and a metal cathode. As depicted in FIGS. 5A and 5B, the metallized mirror precursor 142 comprises the metal sheet 145, which may operate as the metal cathode and may be positioned a gap distance 365 from the anode end 362 such that a gap 364 is disposed therebetween.

Referring still to FIGS. 5A and 5B, the metal sheet 145 comprises a first surface 146 opposite a second surface 148. The metal sheet 145 may comprise a ductile metal sheet comprising a reflective metal material and may be positioned in contact with the end face 118 of the second end 114 of the light diffusing optical fiber 110. Because the metal sheet 145 comprises a ductile material, the end face 118 of the second end 114 of the light diffusing optical fiber 110 may be pressed into one of the surfaces of the metal sheet 145 (e.g., the first surface 146 in the arrangement depicted in FIGS. 5A and 5B) such that a portion 145a of the metal sheet 145 evenly contacts the end face 118. The portion 145a of the metal sheet 145 in contact with the end face 118 may be positioned the gap distance 365 away from the anode end 362 and the metal sheet 145 may be electrically coupled to the voltage source 370. For example, a second electrical pathway 374 may extend between and electrically couple the voltage source 370 to the metal sheet 145.

In operation, the voltage source 370 may generate a voltage signal to initiate an arc discharge along the gap 364 between the anode end 362 and the portion 145a of the metal sheet 145 in contact with the end face 118. The arc discharge forms a high temperature plasma in the gap 364, which melts and/or evaporates the portion 145a of the metal sheet 145, thereby vapor depositing the portion 145a of the metal sheet 145 onto the end face 118 and, upon cooling, forming the metallized mirror coating 140 on the end face 118. In some embodiments, the metal sheet 145 may comprise aluminum or silver, which are highly reflective over the visible spectrum (see FIG. 3A). Further, because of the short duration of arc discharge, silver and aluminum in contact with the end face 118 of the second end 114 may be melted and/or evaporated without melting or deforming the polymer cladding 112. As such, aluminum, silver, or any other reflective metal material having a melting temperature greater than the deformation/melting point of the polymer cladding 122 (e.g., 120° C.) may be used as the metal sheet 145. However, it should be understood that the metal sheet 145 may comprise any of the materials of the metallized mirror coating 140 described above.

Further, the metal anode 360 comprises a metal having a higher melting point than the melting point of the metal sheet 145, for example, the metal anode 360 may comprise platinum, iridium, or a combination thereof. Thus, the metal anode 360 will undergo minimal melting or evaporation upon repeated use, which prevents the material of the metal anode 360 from depositing onto the end face 118 of the second end 114 of the light diffusing optical fiber 110. Further, by minimizing the erosion of the metal anode 360 (e.g., erosion due to melting or evaporation) the gap distance 365 and voltage required to deposit the material of the metal sheet 145 onto the end face 118 remain constant over time, improving process efficiency upon repeated use.

Referring now to FIG. 6, in some embodiments, the electrolytic deposition assembly 300 comprises an anode housing 380 and the metal anode 360 may be at least partially housed in the anode housing 380. In particular, the anode end 362 of the metal anode 360 may be housed within the anode housing 380. Further, the metal sheet 145 may be at least partially disposed within the anode housing 380 and the second end 114 of the light diffusing optical fiber 110 is insertable into the anode housing 380. Further, as depicted in FIG. 6, a fluid pump 382 may be fluidly coupled to the anode housing 380, for example, using a fluid passage 384 extending between and fluidly coupling the fluid pump 382 and the anode housing 380. In operation, the fluid pump 382 may introduce an inert gas, for example, helium or argon into the anode housing 380 such that the arc discharge occurs in the presence of the inert gas. Having the arc discharge occur in the presence of an inert gas may be advantageous because, with air, it is possible that the metal sheet 145 (e.g., the metal cathode) may oxidize or form a nitride when heated. However, the arc discharge in the presence of the inert gas will not cause the metal sheet 145 to oxidize or form a nitride.

Referring again to FIGS. 4-6, a ferrule 111 may be removably coupled to the outer surface 128 of the light diffusing optical fiber 110. The ferrule 111 may comprise a rigid component and the end face 118 of the second end 114 may extend outward from the ferrule 111. In operation, the ferrule 111 provides a grasping location for a user, such that the user may immerse the end face 118 into the heated metal solution 144 (FIG. 4) or press the end face 118 into the metal sheet 145. Further, the ferrule 111 may be configured to engage with the anode housing 380, e.g., with an opening of the anode housing 380, via a threadable engagement, a frictional engagement, a magnetic engagement, or the like, such that the end face 118 of the second end 114 may be repeatably positioned in even contact with the metal sheet 145 proximate the anode end 362 of the metal anode 360.

Further, the immersion deposition assembly 200 and the electrolytic deposition assembly 300 are portable, inexpensive and can be battery powered, allowing the metallized mirror coating 140 to be applied to the end face 118 of the second end 114 of the light diffusing optical fiber 110 by a user in the field as opposed to a well-controlled manufacturing environment, providing a flexible, user friendly system. For example, due to the flexibility of the methods and deposition systems described herein, a customer can purchase a reel of light diffusing optical fiber 110, place a connector on the first end 112 to optically couple the first end 112 and the light output device 102, deploy the light diffusing optical fiber 110, cut the light diffusing optical fiber 110 to the desired final length, then apply the metallized mirror coating 140 to the second end 114. This can be repeated multiple times as light diffusing optical fiber 110 is drawn from the reel. Further, because the metallized mirror coating 140 may be deposited in the field, the final length of the light diffusing optical fiber 110 does not need to be known prior to deployment, and moreover, the reel of light diffusing optical fiber 110 may be cut into lengths that are not specific, equal or consistent, minimizing fiber waste and fiber cost.

Referring again to FIGS. 1-6, a method of forming the metallized mirror coating 140 on the end face 118 of the second end 114 of the light diffusing optical fiber 110 will now be described. The method includes contacting the end face 118 of the second end 114 of the light diffusing optical fiber 110 with the metallized mirror precursor 142. In particular, the end face 118 may directly contact the metallized mirror precursor 142 and the core 120 is coplanar with the polymer cladding 122 at the end face 118 such that the core 120, the polymer cladding 122 each directly contact the metallized mirror precursor 142 at the end face 118. Further, in embodiments comprising the primary coating layer 130 and the secondary scattering layer 132 may also directly contact the metallized mirror precursor 142. Next, the method comprises heating the metallized mirror precursor 142 such that the metallized mirror precursor 142 bonds to the core 120 and the polymer cladding 122 (and in some embodiments the primary coating layer 130 and the secondary scattering layer 132) at the end face 118 thereby forming the metallized mirror coating 140 on the end face 118.

In some embodiments, prior to contacting the end face 118 of the second end 114 with the metallized mirror precursor 142, the method includes cutting (e.g., cleaving) the light diffusing optical fiber 110, for example, to a desired length, such that the end face 118 of the second end 114 comprises a cleaved end face 118. Further, after the metallized mirror coating 140 is formed on the end face 118, the method may comprise directing light output by the light source 104 into the first end 112, such that guided light propagates along the core 120, the plurality of scattering structures 125 scatter a portion of the guided light toward the outer surface 128, and a portion of the guided light that reaches the end face 118 reflects off the metallized mirror coating and propagates along the core 120 back toward the first end 112.

In the embodiment depicted in FIG. 4, in which the metallized mirror precursor 142 comprises the heated metal solution 144, contacting the end face 118 with the metallized mirror precursor 142 comprises immersing the end face 118 in the heated metal solution 144, for example, the heated metal solution 144 housed within the solution container 250 and heated by the heating element 252. The end face 118 of the second end 114 may be immersed into the heated metal solution 144 to a depth of about 3 mm or less, for example, about 2.5 mm, 2 mm, 1.5 mm, 1 mm, 0.75 mm, 0.5 mm, 0.25 mm, 0.2 mm, 0.1 mm, or the like. In some embodiments, a temperature of the heated metal solution 144 when the end face 118 of the second end 114 is immersed in the heated metal solution 144 is less than the melting point of the polymer cladding 122. Thus, when the polymer cladding 122 is immersed into the heated metal solution 144, the temperature of the heated metal solution 144 does not melt or deform or the polymer cladding 122.

Further, in the embodiment depicted in FIG. 4, the method next comprises removing the end face 118 of the second end 114 from the heated metal solution 144 and cooling the heated metal solution 144 now disposed on the end face 118 of the second end 114, thereby forming the metallized mirror coating 140 thereon. In some embodiments, cooling the heated metal solution 144 merely comprises removing the end face 118 of the second end 114 of the heated metal solution 144 such that ambient air cools the heated metal solution 144 disposed on the end face 118 and in other embodiments cooling the heated metal solution 144 comprises applying a fluid, such a cooled air, water, or alcohol, to the heated metal solution 144 disposed on the end face 118.

In the embodiment depicted in FIGS. 5A, 5B, and 6, in which the metallized mirror precursor 142 comprises the metal sheet 145, contacting the end face 118 of the second end 114 of the metallized mirror precursor 142 comprises contacting the end face 118 of the second end 114 with the first surface 146 of the metal sheet 145. Further, heating the metallized mirror precursor 142 comprises positioning the metal anode 360 the gap distance 365 from a portion 148a of the second surface 148 of the metal sheet 145 that is opposite and aligned with the end face 118 of the second end 114, connecting the voltage source 370 to both the metal anode 360 and the metal sheet 145, and generating a voltage signal using the voltage source 370 to initiate an arc discharge between the metal anode and the metal sheet 145. Thus, high temperature plasma is formed in the gap 364, melting and/or evaporating the portion 145a of the metal sheet 145 in contact with the end face 118, such that the reflective metal material of the metal sheet 145 is deposited onto the end face 118, thereby forming the metallized mirror coating 140 on the end face 118.

In embodiments in which the voltage source 370 comprises a fixed voltage source, the arc discharge may be initiated by pushing the end face 118 of the light diffusing optical fiber 110 (which is in contact with the metal sheet 145) toward the anode end 362 of the metal anode 360 until the gap distance 365 of the gap 364 is decreased to a distance at which an electrical field breakdown occurs in the gap 364, thereby initiating the arc discharge within the gap 364. Further, in embodiments in which the voltage source 370 is a pulsed voltage source, the gap distance 365 may be pre-determined based on the voltage of the voltage pulse generated by the voltage source 370, which may be predetermined based on a capacitance between the metal anode 360 and the metal sheet 145.

Aspect (1) pertains to a method of forming a metallized mirror coating on a light diffusing optical fiber, the method comprising: contacting an end face of a second end of a light diffusing optical fiber with a metallized mirror precursor, wherein: the light diffusing optical fiber comprises a first end opposite the second end, a core, a polymer cladding surrounding the core and coplanar with the core at the end face of the second end, an outer surface, and a plurality of scattering structures positioned within the core, the polymer cladding, or both the core and the polymer cladding, and the plurality of scattering structures are configured to scatter guided light toward the outer surface of the light diffusing optical fiber such that a portion of the guided light diffuses through the outer surface along the light diffusing optical fiber, and heating the metallized mirror precursor such that the metallized mirror precursor bonds to the core and the polymer cladding at the end face of the second end of the light diffusing optical fiber thereby forming a metallized mirror coating on the end face of the second end of the light diffusing optical fiber.

Aspect (2) pertains to the method of Aspect (1), wherein the metallized mirror precursor comprises a heated metal solution and contacting the end face of the second end with the metallized mirror precursor comprises immersing the end face of the second end in the heated metal solution.

Aspect (3) pertains to the method of Aspect (2), wherein a temperature of the heated metal solution when the end face of the second end is immersed in the heated metal solution is less than a melting point of the polymer cladding.

Aspect (4) pertains to the method of Aspect (2) or Aspect (3), wherein a melting point of the metallized mirror coating is greater than an equilibrium operating temperature of the light diffusing optical fiber.

Aspect (5) pertains to the method of any one of Aspects (2) through (4), wherein the heated metal solution comprises gallium alloyed with indium, silver, or a combination thereof.

Aspect (6) pertains to the method of any one of Aspects (2) through (5), further comprising removing the end face of the second end from the heated metal solution and cooling the heated metal solution disposed on the end face of the second end, thereby forming the metallized mirror coating on the end face of the second end.

Aspect (7) pertains to the method of any one of Aspects (2) through (6), wherein: the heated metal solution is housed within a solution container comprising a container material having a melting point that is greater than a melting point of the heated metal solution; and the heated metal solution is heated by a heating element thermally coupled to the solution container.

Aspect (8) pertains to the method of any one of Aspects (2) through (7), wherein the end face of the second end is immersed into the heated metal solution to a depth of 3 mm or less.

Aspect (9) pertains to the method of any one of Aspects (1) through (8), wherein: the metallized mirror precursor comprises a metal sheet; contacting the end face of the second end of the light diffusing optical fiber with the metallized mirror precursor comprises contacting the end face of the second end of the light diffusing optical fiber with a first surface of the metal sheet; and heating the metallized mirror precursor comprises: positioning a metal anode a gap distance from a portion of a second surface of the metal sheet that is opposite and aligned with the end face of the second end of the light diffusing optical fiber; connecting a voltage source to both the metal anode and the metal sheet; and generating a voltage signal using the voltage source to initiate an arc discharge between the metal anode and the metal sheet thereby heating a portion of the metal sheet in contact with the end face of the second end of the light diffusing optical fiber and forming the metallized mirror coating on the end face of the second end of the light diffusing optical fiber.

Aspect (10) pertains to the method of Aspect (9), wherein the metal sheet comprises aluminum, silver, or a combination thereof.

Aspect (11) pertains to the method of Aspect (9) or Aspect (10), wherein the metal anode comprises platinum, iridium, or a combination thereof.

Aspect (12) pertains to the method of any one of Aspects (93) through (11), wherein the voltage signal generated by the voltage source comprises a pulsed voltage signal and a fixed voltage signal.

Aspect (13) pertains to the method of any one of Aspects (9) through (12), wherein: the metal anode is housed within an anode housing; and a fluid pump is fluidly coupled to the anode housing and is structurally configured to introduce an inert gas into the anode housing.

Aspect (14) pertains to the method of any one of Aspects (1) through (13), further comprising cleaving the light diffusing optical fiber prior to contacting the end face of the second end with the metallized mirror precursor such that the end face of the second end comprises a cleaved end face.

Aspect (15) pertains to the method of any one of Aspects (1) through (14), further comprising directing light from a light source into the first end of the light diffusing optical fiber such that guided light propagates along the core of the light diffusing optical fiber and the plurality of scattering structures scatter guided light toward the outer surface of the light diffusing optical fiber such that a portion of the guided light diffuses through the outer surface along a diffusion length of the light diffusing optical fiber to provide a scattering induced attenuation of about 50 dB/km or more.

Aspect (16) pertains to the method of Aspect (15), wherein 70% or more of the guided light that reaches the end face of the second end of the light diffusing optical fiber without diffusing through the outer surface reflects off the metallized mirror coating.

Aspect (17) pertains to the method of any one of Aspects (1) through (16), wherein the plurality of scattering structures comprise gas filled voids.

Aspect (18) pertains to a light diffusing optical fiber comprising: a first end, a second end opposite the first end, a core, a polymer cladding surrounding the core, an outer surface, and a plurality of scattering structures positioned within the core, the polymer cladding, or both the core and the polymer cladding, wherein: the first end comprises an end face; the second end comprises an end face opposite the end face of the first end; the polymer cladding is coplanar with the core at the end face of the second end; the plurality of scattering structures are configured to scatter guided light toward the outer surface of the light diffusing optical fiber such that a portion of the guided light diffuses through the outer surface along a diffusion length of the light diffusing optical fiber; and a metallized mirror coating is directly bonded to the core and the polymer cladding at the end face of the second end and comprises a reflective metal material comprising a reflection percentage of about 70% or greater and a melting point that is greater than an equilibrium operating temperature of the light diffusing optical fiber.

Aspect (19) pertains to the light diffusing optical fiber of Aspect (18), wherein a melting point of the metallized mirror coating is less than a melting point of the polymer cladding.

Aspect (20) pertains to the light diffusing optical fiber of Aspect (18) or Aspect (19), wherein the metallized mirror coating comprises gallium alloyed with indium, silver, or a combination thereof.

Aspect (21) pertains to the light diffusing optical fiber of any one of Aspects (18) through (20), wherein the metallized mirror coating comprises aluminum, silver, or a combination thereof.

Aspect (22) pertains to the light diffusing optical fiber of any one of Aspects (18) through (21), wherein the plurality of scattering structures are configured to scatter guided light toward the outer surface to provide a scattering induced attenuation of about 50 dB/km or more along the diffusion length of the light diffusing optical fiber.

Aspect (23) pertains to the light diffusing optical fiber of any one of Aspects (18) through (22), wherein the reflective metal material of the metallized mirror coating comprises a reflection percentage of about 80% or more.

Aspect (24) pertains to the light diffusing optical fiber of any one of Aspects (18) through (23), wherein the reflective metal material of the metallized mirror coating comprises a reflection percentage of about 90% or more.

Aspect (25) pertains to the light diffusing optical fiber of any one of Aspects (18) through (24), wherein the plurality of scattering structures comprise gas filled voids.

Aspect (26) pertains to the light diffusing optical fiber of any one of Aspects (18) through (25), wherein the core comprises a glass core.

Aspect (27) pertains to the light diffusing optical fiber of any one of Aspects (18) through (26), wherein the polymer cladding comprises fluoroacrylate, silicone, or a combination thereof.

Aspect (28) pertains to the light diffusing optical fiber of any one of Aspects (18) through (27), further comprising a scattering layer surrounding the core and the polymer cladding, wherein the scattering layer comprises a scattering material and is configured such that a difference between the minimum and maximum scattering illumination intensity is less than 50% of the maximum scattering illumination intensity, for all viewing angles between 40 and 120 degrees.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present inventive technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present inventive technology, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method of forming a metallized mirror coating on a light diffusing optical fiber, the method comprising:
    contacting an end face of a second end of a light diffusing optical fiber with a metallized mirror precursor, wherein:
        the light diffusing optical fiber comprises a first end opposite the second end, a core, a polymer cladding surrounding the core and coplanar with the core at the end face of the second end, an outer surface, and a plurality of scattering structures positioned within the core, the polymer cladding, or both the core and the polymer cladding, and
        the plurality of scattering structures are configured to scatter guided light toward the outer surface of the light diffusing optical fiber such that a portion of the guided light diffuses through the outer surface along the light diffusing optical fiber, and
    heating the metallized mirror precursor such that the metallized mirror precursor bonds to the core and the polymer cladding at the end face of the second end of the light diffusing optical fiber thereby forming a metallized mirror coating on the end face of the second end of the light diffusing optical fiber.

2. The method of claim 1, wherein the metallized mirror precursor comprises a heated metal solution and contacting the end face of the second end with the metallized mirror precursor comprises immersing the end face of the second end in the heated metal solution.

3. The method of claim 2, wherein a temperature of the heated metal solution when the end face of the second end is immersed in the heated metal solution is less than a melting point of the polymer cladding.

4. The method of claim 3, wherein a melting point of the metallized mirror coating is greater than an equilibrium operating temperature of the light diffusing optical fiber.

5. The method of claim 2, wherein the heated metal solution comprises gallium alloyed with indium, silver, or a combination thereof.

6. The method of claim 2, further comprising removing the end face of the second end from the heated metal solution and cooling the heated metal solution disposed on the end face of the second end, thereby forming the metallized mirror coating on the end face of the second end.

7. The method of claim 2, wherein:
the heated metal solution is housed within a solution container comprising a container material having a melting point that is greater than a melting point of the heated metal solution; and
the heated metal solution is heated by a heating element thermally coupled to the solution container.

8. The method of claim 1, wherein:
the metallized mirror precursor comprises a metal sheet;
contacting the end face of the second end of the light diffusing optical fiber with the metallized mirror precursor comprises contacting the end face of the second end of the light diffusing optical fiber with a first surface of the metal sheet; and
heating the metallized mirror precursor comprises:
positioning a metal anode a gap distance from a portion of a second surface of the metal sheet that is opposite and aligned with the end face of the second end of the light diffusing optical fiber;
connecting a voltage source to both the metal anode and the metal sheet; and
generating a voltage signal using the voltage source to initiate an arc discharge between the metal anode and the metal sheet thereby heating a portion of the metal sheet in contact with the end face of the second end of the light diffusing optical fiber and forming the metallized mirror coating on the end face of the second end of the light diffusing optical fiber.

9. The method of claim 8, wherein the metal sheet comprises aluminum, silver, or a combination thereof, and wherein the metal anode comprises platinum, iridium, or a combination thereof.

10. The method of claim 1, further comprising directing light from a light source into the first end of the light diffusing optical fiber such that guided light propagates along the core of the light diffusing optical fiber and the plurality of scattering structures scatter guided light toward the outer surface of the light diffusing optical fiber such that a portion of the guided light diffuses through the outer surface along a diffusion length of the light diffusing optical fiber to provide a scattering induced attenuation of about 50 dB/km or more.

11. The method of claim 10, wherein 70% or more of the guided light that reaches the end face of the second end of the light diffusing optical fiber without diffusing through the outer surface reflects off the metallized mirror coating.

12. A light diffusing optical fiber comprising:
a first end, a second end opposite the first end, a core, a polymer cladding surrounding the core, an outer surface, and a plurality of scattering structures positioned within the core, the polymer cladding, or both the core and the polymer cladding, wherein:
the first end comprises an end face;
the second end comprises an end face opposite the end face of the first end;
the polymer cladding is coplanar with the core at the end face of the second end;
the plurality of scattering structures are configured to scatter guided light toward the outer surface of the light diffusing optical fiber such that a portion of the guided light diffuses through the outer surface along a diffusion length of the light diffusing optical fiber; and
a metallized mirror coating is directly bonded to the core and the polymer cladding at the end face of the second end and comprises a reflective metal material comprising a reflection percentage of about 70% or greater and a melting point that is greater than an equilibrium operating temperature of the light diffusing optical fiber.

13. The light diffusing optical fiber of claim 12, wherein a melting point of the metallized mirror coating is less than a melting point of the polymer cladding.

14. The light diffusing optical fiber of claim 12, wherein the metallized mirror coating comprises gallium alloyed with indium, silver, or a combination thereof.

15. The light diffusing optical fiber of claim 12, wherein the metallized mirror coating comprises aluminum, silver, or a combination thereof.

16. The light diffusing optical fiber of claim 12, wherein the plurality of scattering structures are configured to scatter guided light toward the outer surface to provide a scattering induced attenuation of about 50 dB/km or more along the diffusion length of the light diffusing optical fiber.

17. The light diffusing optical fiber of claim 12, wherein the reflective metal material of the metallized mirror coating comprises a reflection percentage of about 80% or more.

18. The light diffusing optical fiber of claim 12, wherein the reflective metal material of the metallized mirror coating comprises a reflection percentage of about 90% or more.

19. The light diffusing optical fiber of claim 12, wherein the core comprises a glass core.

20. The light diffusing optical fiber of claim 12, further comprising a scattering layer surrounding the core and the polymer cladding, wherein the scattering layer comprises a scattering material and is configured such that a difference between the minimum and maximum scattering illumination intensity is less than 50% of the maximum scattering illumination intensity, for all viewing angles between 40 and 120 degrees.

* * * * *

UNITED STATES PATENT AND TRADEMARK OFFICE
CERTIFICATE OF CORRECTION

PATENT NO. : 11,378,736 B2
APPLICATION NO. : 16/754880
DATED : July 5, 2022
INVENTOR(S) : Anthony Sebastian Bauco et al.

It is certified that error appears in the above-identified patent and that said Letters Patent is hereby corrected as shown below:

On the Title Page

In Column 2, under "Other Publications", Line 3, delete "(2013." and insert -- (2013). --.

Signed and Sealed this
First Day of August, 2023

Katherine Kelly Vidal
*Director of the United States Patent and Trademark Office*